Figure 1:
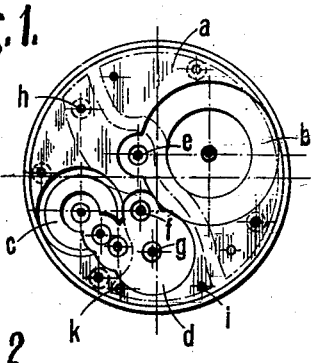

Feb. 2, 1926.

H. COLOMB 1,571,756

MANUFACTURING PROCESS OF BLANKS FOR WATCH MOVEMENTS
PROVIDED WITH JEWEL IN-SETTING OR PLUG HOLES

Filed Oct. 5, 1922

REISSUED AS NO. 16590 APRIL 19 1927

Inventor
H. Colomb
By Marks or Clerk
Attys.

Patented Feb. 2, 1926.

1,571,756

UNITED STATES PATENT OFFICE.

HENRI COLOMB, OF TAVANNES, SWITZERLAND.

MANUFACTURING PROCESS OF BLANKS FOR WATCH MOVEMENTS PROVIDED WITH JEWEL-INSETTING OR PLUG HOLES.

Application filed October 5, 1922. Serial No. 592,642.

*To all whom it may concern:*

Be it known that I, HENRI COLOMB, citizen of the Confederation of Switzerland, residing at Tavannes, Switzerland, have invented certain new and useful Improvements in the Manufacturing Processes of Blanks for Watch Movements Provided with Jewel-Insetting or Plug Holes, of which the following is a specification.

This invention relates to improvements in blanks for watch movements.

According to the manufacturing process hitherto adopted for turning out watch movement plates and bridges, the movement blank is always completed by the operations connected with uprighting and jewel-setting, which operations require skilled labour and more or less complicated machinery, as well as first grade tools, the gauging and maintenance whereof are often costly and troublesome. If as a consequence said tools are not repaired when they should be, the result is that complete series of watch pieces are made with persistent defects or imperfections which are detected only when the movements are "assembled" or "finished up" and which are the cause of serious inconveniences, both to manufacturers and workmen.

According to the usual method of manufacturing movement blanks, the accuracy of the working holes which serve as guiding marks and for a means of mounting and rotating the plates during machining, gradually decreases as the blanks are completed, and, for the later operations connected with the uprighting and jewel-setting, the very basis required for obtaining thoroughly interchangeable parts is wanting. Further, the footholes in the plate and bridge are generally produced according to prickpunching only, which method requires in all cases, a separate manipulation of each movement, and the plates and also the bridges to be fitted thereunto then require to be numbered in order to secure, after uprighting or jewel-setting, a co-axial position of the holes wherein the staff pivots are to revolve.

In recent years, certain manufacturers have endeavoured to do away with numbering and to alter the uprighting system by stamping out by means of a die punch the foot-holes in the plate together with the working holes used therewith as guides for the later operations. The foot-holes in bridges being duly rectified, this method allows of uprighting the bridges on special working plates, independently of the movement plates. But jewel-setting the bridges as well as uprighting and jewel-setting the plates are performed by machinery, or by tools similar to those employed when the movement blank is executed according to the method hereinbefore described.

The principal object of the present invention, is to avoid the necessity for uprighting the plates and bridges, and to do away with the method of jewel-setting in current use with all machines and working-plates required for such operations. A further object of the invention is to secure thorough interchangeability and thus dispense with the necessity for numbering the pieces. A still further purpose of the invention is to provide for quick and accurate testing of the plates and bridges, at any time, or at any stage of the machining thereof, by means of suitable gauges.

The manufacturing process according to the present invention relates to blanks for watch movements fitted with jewel in-settings or plugs within which the staffs or spindles revolve, and is characterized by the relative positions of the jewel in-setting or plug holes and of the foot-holes being accurately located when the blanks are finished or nearly so, by simultaneous die rectification of the corresponding borings. It is to be understood that other borings and adjustments eventually required in connection with fitting other parts of the movement, may also be rectified at the same time; so as to avoid any further uprighting.

This rectification, as regards movement plates, may be performed according to the usual working holes or according to two or more additional working holes, the latter being rectified on the basis of the former, or vice versa, at the right moment. Said additional working holes may serve later for a definite object or purpose, they may for example be used to locate pillars, head-pins, jewel in-settings or plugs and the like.

For turning out the bridges, a similar method is employed: the jewel in-setting or plug hole or holes and the foot-holes may be rectified at the same time, or on the other hand, the screw holes are rectified when cutting out the jewel-setting or plug hole or holes, and then after subsequent rectification, are themselves used as working holes when the jewel in-setting hole or holes and the foot-holes in the bridge are rectified with the die. Should the number of holes provided, for example, in a bridge, be inadequate to allow of two, at least, of these holes being taken as guiding-marks, one of said holes may be taken in combination with a portion of the outside periphery of the bridge, or the complete outside periphery of said bridge, may be used.

When on the one hand the position of the foot-holes in bridges relatively to the axis of the jewel in-setting hole or holes, has been exactly located, through an accurate rectification of all these parts, and on the other hand, the corresponding holes in the plate have also been rectified in a similar reliable manner, thoroughly interchangeable pieces will be obtained. Later on, the holes for plugs or jewel in-settings will receive their corresponding pieces, the periphery whereof has been exactly rectified and centered according to the pivot bearings.

It will be readily understood that with such jewel in-settings or plugs located in conformity with the hereinbefore described method, not only the plates and bridges are interchangeable, but also the wheel staffs or spindles will be maintained straight, while the distances between centers will remain fixed throughout a series. The latter advantage is very important, since it allows of using accurate and interchangeable parts, thus helping both factory operator and repairer. Operations connected with assembling and finishing-up are thus greatly simplified by this invention since they may be performed in shorter time and by less skilled hands, while improved results are also obtained.

In particular the necessity for finishing up, an operation which hitherto has always required specialized workmen, will be greatly reduced if not entirely eliminated especially when the elements are manufactured as they should be, viz., to standard measurements.

It is further pointed out that plugs and jewel in-settings, manufactured according to the present invention are interchangeable since their diameters are accurate and the holes in plates and bridges, within which they are located, are easily rectified to maximum clearance of a quarter of one hundredth of millimeter. The difference in diameter between the jewel in-setting or plug and its housing is such that should it be necessary, for any reason to remove or change the plug in course of manufacture or when repairing the movement, this operation may be easily performed without special tools.

The holes for in-settings or plugs may either be previously drilled or cut out.

The invention is illustrated in the accompanying drawings in which Fig. 1 illustrates a plate.

Figure 2:
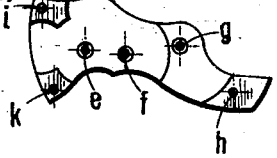

Fig. 2 bridge piece.

Figures 3, 4:
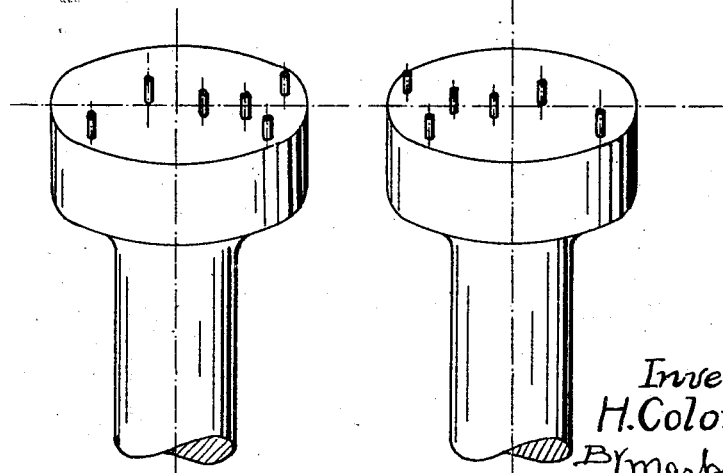

Figs. 3 and 4 illustrating tools for making cavities having as many matrices as there are holes in the plate and bridge respectively.

Referring now to Fig. 1, I here illustrate a plate $a$ which has been worked out with several recesses $b$, $c$, $d$ for the movement of the pinions. This working has deformed the plate so that holes $e$, $f$, $g$ for stone setting and $h$, $i$ for affixing the bridge are no longer accurately spaced. According to the invention the said holes $e$, $f$, $g$ are rectified and the holes $h$, $i$ trued by the tool illustrated in Fig. 3. In practice all the bridge-supporting holes and the stone setting holes may be trued in one operation, the tool having as many as 20 or 30 matrices.

Similarly the holes in the bridge piece of Fig. 2 are trued by the tool shown in Fig. 4.

Having now particularly described and ascertained the nature of my said invention, and in what manner the same is to be performed, I declare that what I claim is:—

1. In a manufacturing process for blanks of watch movements provided with holes for settings and bushes the procedure of establishing the interchangeability of each piece by first putting-in all the holes according to suitable guide marks and then of rectifying all the holes of each piece simultaneously by means of one and the same punch which is likewise guided by suitable but particular marks.

2. In a manufacturing process for blanks of watch movements provided with holes for settings and bushes the procedure of establishing the interchangeability of the bridges by first putting-in all the holes according to at least two holes used as guide marks and then rectifying all the holes of each bridge simultaneously by means of one and the same punch which is likewise guided by guide marks comprising parts of the peripherical surface of the bridge.

In testimony whereof I affix my signature.

HENRI COLOMB.